United States Patent
Lett

[19]

[11] Patent Number: 6,055,098

[45] Date of Patent: Apr. 25, 2000

[54] PERISCOPE WITH AN ADJUSTABLE MAGNIFYING MEANS

[76] Inventor: Anthony W. Lett, 18645 Teppert, Detroit, Mich. 48234

[21] Appl. No.: 09/193,938

[22] Filed: Nov. 17, 1998

[51] Int. Cl.[7] ............................. G02B 23/08; G02B 5/08
[52] U.S. Cl. ........................ 359/402; 359/405; 359/857; 359/894
[58] Field of Search .................. 359/399–409, 359/432, 422, 802–811, 895, 857

[56] References Cited

U.S. PATENT DOCUMENTS

| | | | |
|---|---|---|---|
| 1,098,905 | 6/1914 | Humbrecht | 359/402 |
| 1,445,284 | 2/1923 | Bell et al. | 359/402 |
| 2,512,792 | 6/1950 | Delaney | 359/402 |
| 3,551,032 | 12/1970 | Dunn, Jr. | 359/857 |
| 4,704,000 | 11/1987 | Pekar et al. | 359/402 |
| 4,763,988 | 8/1988 | Hamilton | 359/894 |
| 4,868,588 | 9/1989 | Hajnal | 359/432 |
| 4,981,346 | 1/1991 | Marschner | 359/402 |
| 5,134,519 | 7/1992 | Abele et al. | 359/405 |
| 5,495,370 | 2/1996 | Tuffen | 359/402 |
| 5,526,177 | 6/1996 | Fantone | 359/402 |

FOREIGN PATENT DOCUMENTS

| | | | |
|---|---|---|---|
| 161924 | 10/1954 | Australia | 359/857 |
| 17355 | of 1915 | United Kingdom | 359/402 |

Primary Examiner—Thong Nguyen
Attorney, Agent, or Firm—Kenneth L. Tolar

[57] ABSTRACT

A periscope includes a housing having two opposing side walls, a rear wall, a front wall, a top end and a bottom end. On the front wall, adjacent the top end, is an upper opening in communication with an interior chamber. An upper light reflecting device is positioned within the interior chamber to reflect light downwardly toward the bottom end of the housing. The housing further includes a lower viewing opening on the rear wall adjacent the bottom end that is likewise in communication with the interior chamber. A second light reflecting device is positioned within the chamber, somewhat facing both the viewing opening and the light reflecting device, for projecting light from the upper light reflecting device toward the viewing opening. An adjustable magnifying assembly is mounted between the upper opening and the upper light reflecting device for magnifying images projected to the viewing opening. The magnifying assembly is horizontally movable within the housing to vary the degree of magnification.

4 Claims, 2 Drawing Sheets

PERISCOPE WITH AN ADJUSTABLE MAGNIFYING MEANS

BACKGROUND OF THE INVENTION

The present invention relates to a periscope having an adjustable magnifying means that allows a user to view and magnify distant objects when a user's normal line of sight is obstructed.

DESCRIPTION OF THE PRIOR ART

A spectator's view of various sporting events, shows and similar public performances is often obstructed by people standing or seated in front of the spectator. Various periscopes have been heretofore designed for viewing objects in which the viewer's line of sight is obstructed, none of which are necessarily designed for spectators. Additionally, not only is a spectator's view sometimes obstructed, the action being observed is often occurring at a significant distance from the viewer requiring the use of binoculars or similar means to magnify or enlarge the observed object.

The present invention provides a periscope primarily designed to allow a spectator to view an event when his direct line of sight is obstructed by another spectator or object. Furthermore, the periscope includes an adjustable magnifying means that allows a user to variably magnify an image being viewed.

Various periscopes and similar devices exist in the prior art. For example, U.S. Pat. No. 5,526,177 issued to Fantone relates to a dual view immersible periscope having an upper viewing compartment that operates in air and a lower compartment that floods with water as the periscope is immersed. The upper and lower compartments are separated with a transparent window.

U.S. Pat. No. 5,495,370 issued to Tuffen relates to a surveillance device including a fake radio aerial that projects from the roof of a vehicle. The aerial includes a periscope that is rotatable 360 degrees. In the vehicle, the light for the periscope is bent 90 degrees and is viewed by a camera all of which are concealably stored within the headliner space of the vehicle.

U.S. Pat. No. 5,134,519 issued to Abele et al relates to a periscope switch over mirror system having an even number of reflection surfaces for enabling a user to view a first scene in a first sight direction and an uneven number of reflection surfaces for enabling the user to view a second scene in a second sight direction rearward of the observer. One of the reflection surfaces is disposed on a member which is pivoted about a pivot axis arranged eccentrically with respect to the member.

U.S. Pat. No. 4,868,588 issued to Hajnal relates to a rotatable snorkel camera system including a light admitting opening at one end of the housing and the prime lens of a camera connected to the other end. The housing is rotatably mounted on the prime lens such that the housing can be rotated about the camera to any position. The image seen in the view finder of the camera is viewed in the correct attitude regardless of the position to which the snorkel housing is rotated.

U.S. Pat. No. 4,763,988 issued to Hamilton relates to a periscope apparatus comprising a single inverted pyramid having highly reflective exterior surfaces and includes a window for transmission of radiation to an optical device within the head. The geometry and reflection of the head render it relatively indistinguishable in use from the surrounding area.

U.S. Pat. No. 2,512,792 issued to Delaney relates to a rear vision periscope type reflector for motor vehicles in which the periscope or housing is attached to the outside of the windshield.

As indicated above, none of the conventional periscope assemblies include an adjustable magnifying means for selectively magnifying distant objects. Furthermore, the present invention includes a periscope housing having opposing recessed handles which may be conveniently grasped when a user holds the viewing opening adjacent the user's eyes. Furthermore, the housing includes a top mounted carrying handle allowing a user to easily transport the device from one location to another.

SUMMARY OF THE INVENTION

The present invention relates to a periscope specifically designed for spectators of sporting contests and similar public events. The device comprises a housing having a pair of side walls, a front wall, a rear wall, a bottom end and a top end. On the front wall, adjacent the top end, is a substantially rectangular, upper opening in communication with an interior chamber. Disposed within the interior chamber is an obliquely oriented, upper mirror having a reflective surface somewhat facing the opening on the front wall. The mirror is positioned so that light entering the upper opening strikes the mirror and is reflected downwardly towards the bottom end of the housing. Between the upper opening and the upper mirror is a magnifying lens for magnifying light entering the upper opening. The magnifying lens is mounted to an adjustment assembly that allows the lens to be moved towards and away from the upper opening to vary the magnification of an object being viewed. On the rear wall of the housing, adjacent the bottom end, is a second substantially rectangular viewing opening. A second lower mirror is obliquely positioned within the interior chamber and is substantially parallel to the upper mirror. The reflective surface of the lower mirror, however, faces the reflective surface of the upper mirror such that light reflected downwardly from the upper mirror is directed towards the viewing opening. It is therefore an object of the present invention to provide a periscope device specifically designed for sporting events.

It is yet another object of the present invention to provide a periscope having an adjustable magnifying means allowing a user to selectively magnify an object being viewed therewith.

It is yet another object of the present invention to provide a portable periscope which may be easily transported. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
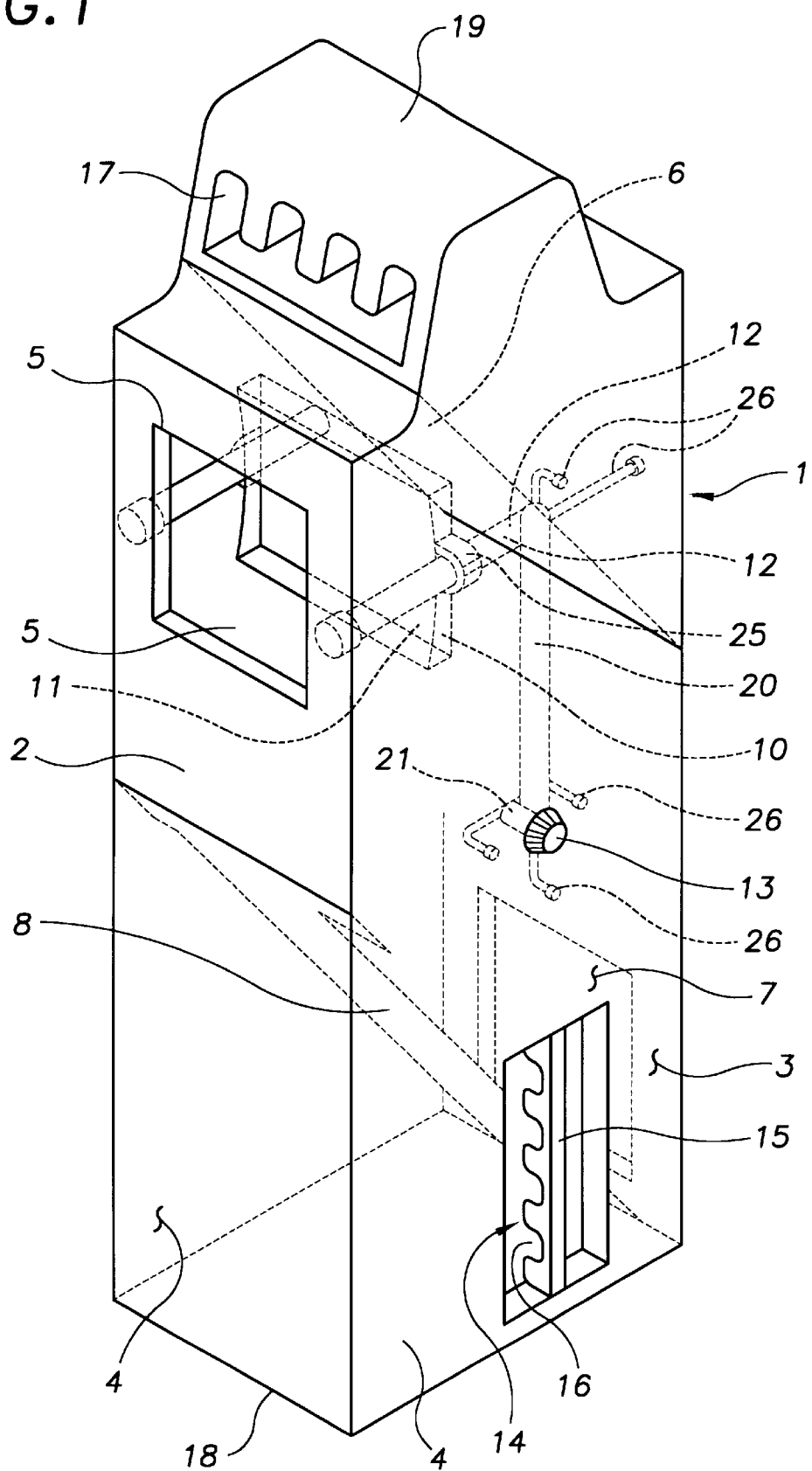
FIG. 1 is a perspective view of the inventive device.
Figure 2:
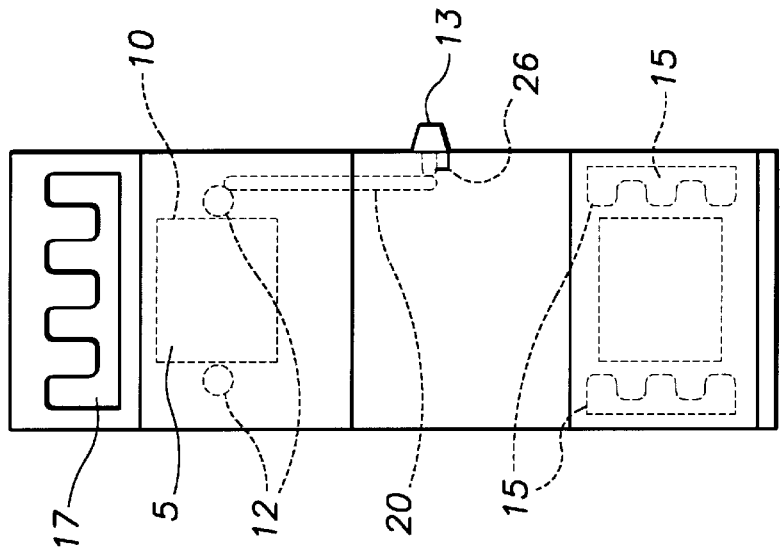
FIG. 2 is a rear view of the inventive device.
Figure 3:
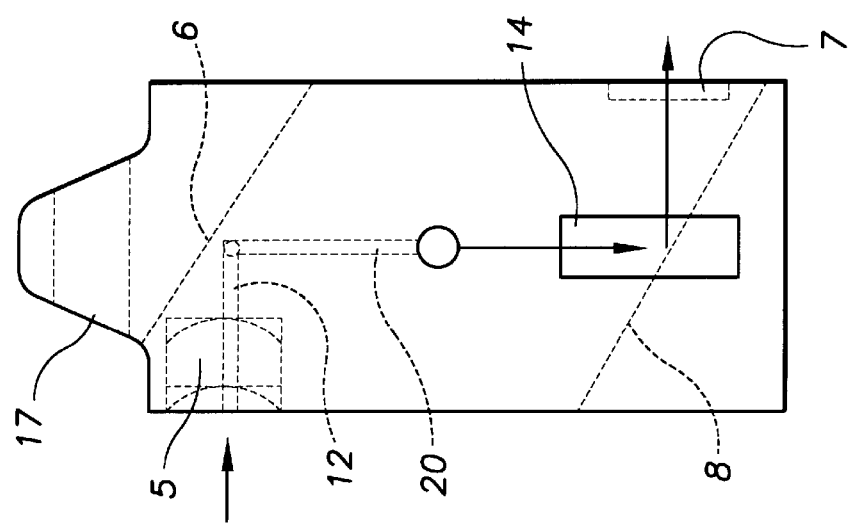
FIG. 3 is a side view of the inventive device.
Figure 4:
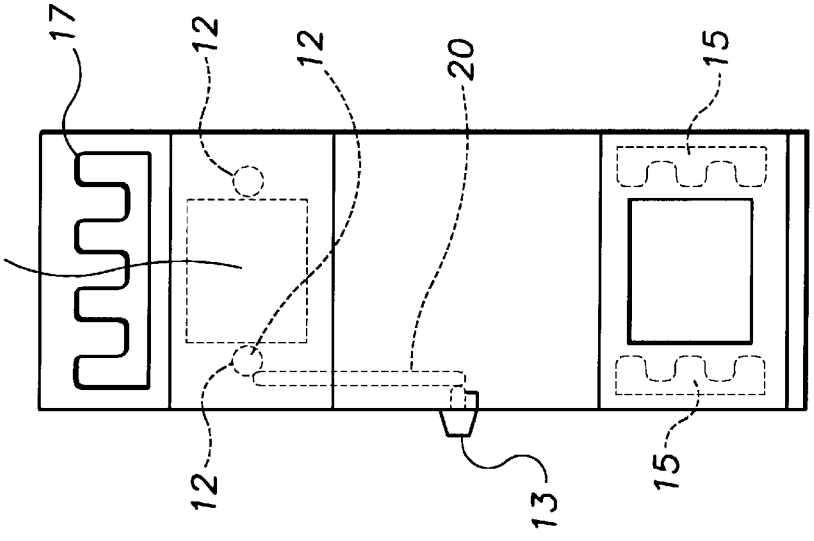
FIG. 4 is a front view of the inventive device.

Referring now to FIGS. 1 through 4, the present invention relates to a periscope primarily designed for spectators or similar users. The device comprises a substantially vertically oriented housing 1 having front 2, rear 3 and two opposing side walls 4, a bottom end 18 and a top end 19. On the front wall adjacent the top end, is a substantially rectangular, upper light receiving opening 5 in communication with an interior chamber. Obliquely disposed within the interior chamber is an upper mirror 6 having a reflective surface substantially facing both the upper opening and the bottom end of the housing to deflect light downwardly thereto. The mirror extends from the interior surface of the housing top end to the interior surface of the rear wall.

The rear wall of the housing includes a lower, substantially rectangular viewing opening 7 adjacent the bottom end. Obliquely disposed within the interior chamber and adjacent the lower viewing opening is a lower mirror 8 having a reflective surface substantially facing both the viewing opening and the upper mirror whereby light received therefrom is projected toward the viewing opening. The mirror extends from the interior surface of the housing, adjacent the intersection of the bottom end and rear wall, to the interior surface of the front wall.

Disposed between the upper mirror and the upper opening is a magnifying means for allowing a user to selectively magnify distant objects being viewed through the viewing opening. The magnifying means includes a lens frame 10 having two opposing side edges, a top edge and a bottom edge with a magnifying lens 11 disposed therebetween. Each side edge includes a collar 25 extending therefrom, at least one of which is internally threaded. The threaded collar receives an externally threaded, horizontal guide shaft 12 rotatably mounted within the interior chamber. An end of the guide shaft includes a worm gear which matably engages a second worm gear on the upper end of a vertically disposed drive shaft 20. The lower end of the drive shaft 20 includes a similar worm gear that engages the end of a second horizontal worm gear member 21. The opposing end of the second horizontal worm gear member protrudes through a side wall of the housing and has a knob 13 attached thereto. The drive shaft, guide shaft and worm gear member are mounted within the interior chamber with brace members 26. Rotation of the knob results in cooperative rotation of the gear member, the drive shaft and the guide shaft thereby moving the lens frame backwards or forwards along the guide shaft. Accordingly, a user may vary the degree of magnification of distant objects being viewed in the viewing opening by rotating the knob in either direction.

The side walls of the base component each include an indention 14 adjacent the bottom end thereof having an inwardly facing handle member 15 received therein. Each handle member includes a plurality of recessed portions 16 facing the housing for receiving a user's fingers. The handle members assist a user in holding the device in an upright position when viewing an object. The top end of the base component includes a handle member 17 integrally extending therefrom which may be grasped by a user when transporting the device.

To use the above described device, a user grasps the side mounted handles and positions the lower opening adjacent the user's eyes. To vary the apparent size of the object being viewed, the knob is rotated in either direction.

The above described device is not to be limited to the exact details of construction and arrangement of parts shown and described. For example, although a worm gear assembly has been depicted for advancing the magnifying lens towards and away from the opening, other similar, conventional means may also be used.

The base component of the present invention is preferably constructed with plastic or a similar lightweight equivalent. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A periscope comprising:
    an elongated, vertically oriented housing having a front wall, a rear wall and two side walls, a top end and a bottom end, said front wall having an upper, light receiving opening in communication with an interior chamber, said opening adjacent the top end of said housing, said rear wall including a lower viewing opening adjacent the bottom end of said housing;
    an upper light reflecting means positioned within said interior chamber for receiving light from said upper opening and for reflecting said light downwardly towards the bottom end of said housing;
    a second, lower light reflecting means positioned within said interior chamber for receiving light from said first reflecting means and for projecting said light toward said lower viewing opening;
    an adjustable magnifying means for magnifying light projected to said viewing opening, said magnifying means including a magnifying lens disposed between said upper light reflecting means and said upper opening;
    a knob rotatably mounted to a side wall of said housing;
    a worm gear assembly in mechanical communication with said knob and said lens whereby said lens moves towards and away from said upper opening as said knob is rotated.

2. The periscope according to claim 1 wherein said worm gear assembly includes:
    a horizontal worm gear member having first and second ends, the first end protruding through said housing and having the knob attached thereto, the second end operably engaging an end of a vertical shaft received within said housing;
    a horizontal guide shaft received within said housing, said guide shaft having a threaded portion threadedly engaging a collar attached to said lens and an end operably engaging an opposing end of said vertical shaft whereby rotation of said knob results in said gear member, said vertical shaft and said guide shaft rotating in unison so that said lens moves towards and away from said upper light reflecting means.

3. The periscope according to claim 2 wherein the top end of said housing further includes a handle integrally extending therefrom.

4. The periscope according to claim 3 wherein the housing side walls each have an indention thereon with an inwardly facing handle member received therein, each of which is grasped by a user to position the viewing opening in front of the user's eyes.

* * * * *